United States Patent [19]

Ridyard et al.

[11] 4,213,759
[45] Jul. 22, 1980

[54] COLORATION PROCESS: MIXED DYES FOR DIFFERENTIAL-DYEING NYLON MIXTURES

[75] Inventors: Denis R. A. Ridyard; Charles W. Taylor, both of Manchester, England

[73] Assignee: Imperial Chemical Industries Limited, London, England

[21] Appl. No.: 962,787

[22] Filed: Nov. 20, 1978

Related U.S. Application Data

[63] Continuation of Ser. No. 889,925, Mar. 24, 1978, abandoned.

[30] Foreign Application Priority Data

Apr. 5, 1977 [GB] United Kingdom ............... 14314/77

[51] Int. Cl.² ....................... C09B 27/00; C09B 45/43
[52] U.S. Cl. .......................................... 8/643; 8/676; 8/531
[58] Field of Search ............... 8/26, 1 XB, 41 B, 39 B

[56] References Cited

U.S. PATENT DOCUMENTS

| 3,725,384 | 4/1973 | Zickendraht et al. ........................ 8/4 |
| 3,958,930 | 5/1976 | Speck ......................................... 8/26 |

FOREIGN PATENT DOCUMENTS

| 852048 | 9/1977 | Belgium . |
| 1466069 | 3/1977 | United Kingdom . |
| 1482356 | 8/1977 | United Kingdom . |
| 1485438 | 9/1977 | United Kingdom . |

Primary Examiner—A. Lionel Clingman
Attorney, Agent, or Firm—Cushman, Darby & Cushman

[57] ABSTRACT

Differential-dyeing nylon fibres are dyed or printed with a mixture of compatible dyes selected from spcified classes of yellow, orange, red and blue disulphonated or monosulphonated/monocarboxylated monoazo, disazo and anthraquinone dyes.

2 Claims, No Drawings

COLORATION PROCESS: MIXED DYES FOR DIFFERENTIAL-DYEING NYLON MIXTURES

This is a continuation, of application Ser. No. 889,925 filed Mar. 24, 1978 now abandoned.

This invention relates to a coloration process and particularly to a process for dyeing or printing differential dyeing nylon fibres with mixtures of acid dyes.

The range of synthetic dyes available to the dyer or textile printer for application to any particular textile fibre is large and enables him, if he wishes, to produce a wide range of shades using single dyes. In practice, however, extensive use is made of mixtures of dyes. In some cases this is a matter of necessity because it is not possible to produce a particular shade with a single dye but, in general, it is a matter of convenience for the operator to be able to cover practically the whole colour spectrum by a suitable combination of a small number of dyes, particularly those exhibiting the primary colours. The selection of the components of dye mixtures is not made on the basis of colour alone, however, since it is recognised that the individual dyes must be mutually compatible in the sense of having similar application and fastness properties.

One class of dyes used for dyeing nylon is the class known as acid dyes which provide a range of shades having a high degree of washing and light fastness. The acid dyes show a wide variation in dyeing properties when applied to nylon and the components of mixtures must be very carefully chosen. The dyestuff manufacturer usually assists the dyer in this respect by publishing information on the dyeing characteristics of his products and their suitability for use in combination shades.

The problems involved in dyeing nylon with mixtures of acid dyes have been aggravated by the development of differential-dyeing nylon fibres. These fibres consist of nylons which have been chemically modified so as to increase or reduce their affinity for acid dyes. When an acid dye is applied to a mixture of the fibres, attractive tone-in-tone effects can be obtained, some fibres being dyed more deeply than others. The contrast in depth obtained on a given mixture of fibres depends on the structure of the dye and on the dyeing conditions used. Some acid dyes give a very marked contrast between the deeper-dyeing and the lighter-dyeing fibres but not all of these dyes give satisfactory results when used in mixtures, resulting not only in depth variations but also in undesirable colour variations between the different types of nylon. A similar problem can arise when mixtures of acid dyes are applied to differential-dyeing nylons by printing methods.

The present invention is based on the discovery that certain acid dyes are mutually compatible and provide attractive high contrast tone-in-tone effects in mixture shades on differential-dyeing nylons.

Thus, according to the present invention, there is provided a process for dyeing or printing a mixture of differential dyeing nylon fibres which comprises applying thereto, by a dyeing or printing method, an aqueous solution containing a combination of dyes selected from at least two of the following classes, the dyes being shown in the form of the free acids:

(i) a yellow dye of the formula:

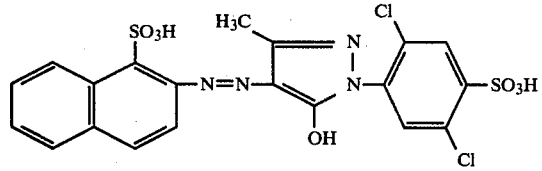

(ii) orange dyes of the formula:

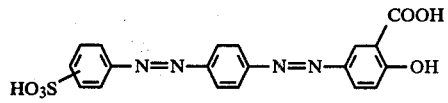

(iii) orange dyes of the formula:

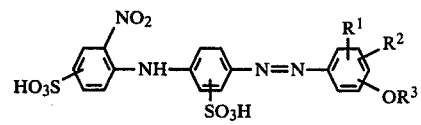

wherein $R^1$ represents hydrogen or alkyl, $R^2$ represents hydrogen, alkyl, aryl or alkoxy and $R^3$ represents hydrogen, alkyl, acyl or arylsulphonyl, the $-OR^3$ group being in the 2- or 4-position relative to the azo group and the substituents $R^1$, $R^2$ and $R^3$ being so chosen that their total number of carbon atoms is from 4 to 8;

(iv) red dyes of the formula:

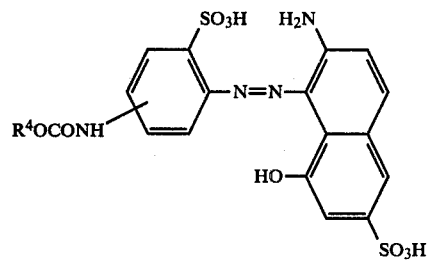

wherein the $R^4OCONH-$ group is in the 4— or 5-position relative to the azo group and $R^4$ represents an alkyl, cycloalkyl, or aralkyl radical containing from 4 to 8 carbon atoms;

(v) blue dyes of the formula:

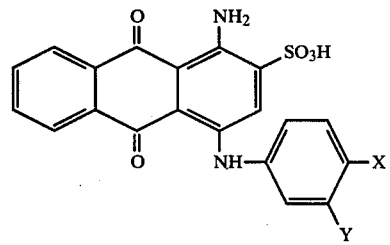

wherein one of X and Y represents $-SO_3H$ and the other represents $-NHCOOR^5$ wherein $R^5$ represents an alkyl, cycloalkyl or aralkyl radical containing up to 8 carbon atoms; and (vi) blue dyes of the formula:

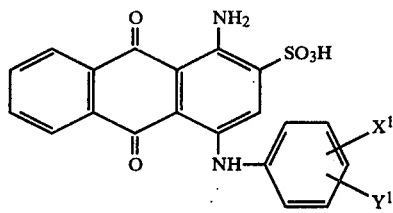

wherein one of $X^1$ and $Y^1$ represents —SO₃H and the other represents a chlorine atom.

The dyes of classes (i), (ii) and (vi) are known in the art. Orange dyes of class (iii) have been described in German Offenlegungsschrift 2421579 and German Offenlegungsschrift 2710465, red dyes of class (iv) have been described in German Offenlegungsschrift 2538370 and blue dyes of class (v) have been described in German Offenlegungsschrift 2546042.

The dyes of classes (i) to (v) are of particular value in the process of the invention.

In preparing the dyebath or printing paste, the dyes are selected from the aforementioned classes (i) to (vi) or (i) to (v) and used in appropriate amounts to give the desired shade on the nylon fibres. Generally, not more than one dye is selected from each class. The dyes may be used in the free acid forms shown or they may be used in the form of their water-soluble salts especially the sodium salts, in which form acid dyes are usually manufactured and sold. If desired, however, the dyes may be used in the form of other salts, for example lithium, potassium, ammonium or triethanolamine salts.

The preferred dyebaths or printing pastes are those in which the dyes are selected from at least two of the following:

A yellow dye of the formula:

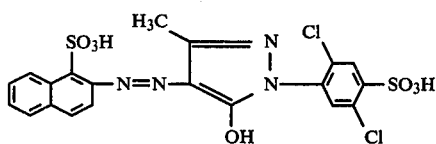

(Formula 1)

an orange dye of the formula:

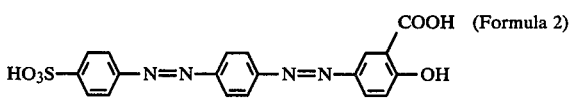

(Formula 2)

a red dye of the formula:

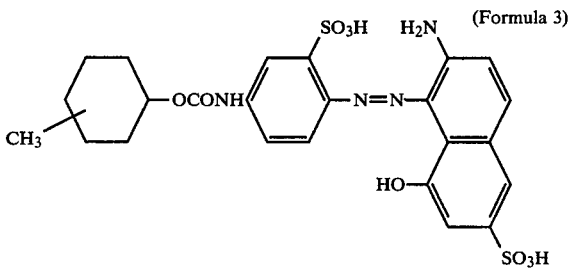

(Formula 3)

and a blue dye of the formula:

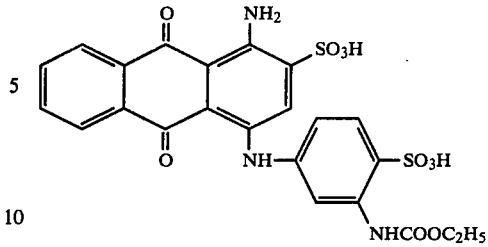

(Formula 4)

or of the formula:

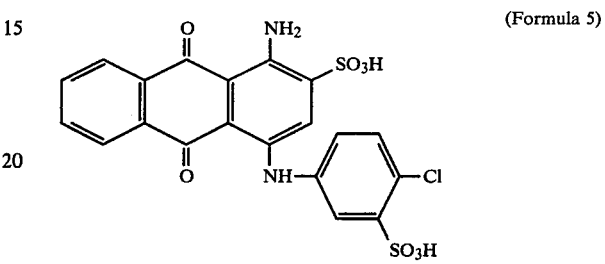

(Formula 5)

The dyes of Formulae 1 to 4 are of particular value in the process of the invention.

The dyeing process of the invention may be carried out in a batchwise or continuous manner using methods that have been described in the prior art for the application of acid dyes to differential-dyeing nylons. In addition to the aforementioned dyes, the dyebath may contain other conventional ingredients, for example buffering agents preferably to give a pH in the range 5–8 levelling agents, anti-foam agents and also, where special effects are required, other dyes, for example other acid dyes, disperse dyes or basic dyes.

The process of the invention is particularly valuable for dyeing tufted nylon carpeting containing differential-dyeing nylon yarns.

In the continuous dyeing of carpets, the use of mixtures of incompatible dyes results in hue differences between the upper and lower parts of the tufts of the carpet owing to the individual dyes migrating and fixing at different rates during the steaming operation. This can be demonstrated by applying a pad liquor containing a particular dye combination to one-third of a strip of level-loop nylon carpet using a continuous dyeing machine, for example Kusters equipment described in Textile Chemist and Colorist, Jan. 14, 1970, pages 23–29, and fixing by steaming for ten minutes in a vertical position with the impregnated portion uppermost. The dye liquor moves down the strip of carpet as fixation occurs. After washing off and drying, examination of the carpet reveals whether the hue remains constant from top to bottom, indicating a compatible mixture of dyes, or changes, indicating incompatibility. Using this test, the dyes used in the process of the present invention can be demonstrated to be compatible.

In batchwise dyeing, an important consideration is that the dyes used should not be sensitive to variations in the pH of the dyebath. In general, variation of the pH affects the exhaustion rate and, for reproducible results, it is desirable that the effect of pH change should be small. The dyes used in the process of the present invention are less sensitive to changes in dyebath pH than other dyes which have been proposed for the dyeing of differential-dyeing nylons.

When the process of the invention is operated as a printing method, the dyes are applied to the mixture of differential-dyeing nylon fibres in the form of a printing paste which may contain other conventional ingredients, for example thickening agents, anti-frosting agents, anti-foaming agents and buffering agents, preferably to give a pH in the range 4–7. Any of the conventional methods of applying printing pastes may be employed. As in dyeing processes, the compatibility of the dyes when printed on to carpets containing mixtures of differential-dyeing yarns is shown by the excellent tone-in-tone effects obtained.

In addition to the features already mentioned, dyeings and prints obtained by the process of the invention have a high degree of fastness to light and to wet treatments.

The invention is illustrated but not limited by the following Example in which all parts and percentages are by weight.

EXAMPLE 1

A pad liquor is prepared containing:
0.03% of the yellow dye of Formula 1
0.03% of the red dye of Formula 3
0.03% of the blue dye of Formula 4
0.2% of a sulphated ethylene oxide adduct of a fatty alcohol
0.8% of a purified natural gum thickener
0.5% of mixed sodium phosphates to give a pH of 6.5

A strip of nylon carpet containing acid dye-resist, basic-dyeable nylon yarn (ICI Fibres Type K201B), regular dyeing nylon yarn (ICI Fibres Type K201) and ultra-deep dyeing nylon yarn (ICI Fibres Type K201E) is passed through a wetting-out liquor and then the top one-third is immersed in the pad liquor to give a pick-up of 300%.

The carpet is steamed vertically for ten minutes at 100°–105° C., rinsed thoroughly and dried. The hue is constant from top to bottom of the strip and good, high-contrast, tone-in-tone effects are obtained on the differential-dyeing yarns. This indicates that, under bulk scale application conditions, there would be no tendency for the individual dyes comprising the dye mixture to show hue variations either from the tips to the base of the carpet pile tufts or from one nylon type to the other.

EXAMPLE 2

A pad liquor is prepared containing:
0.028% of the yellow dye of Formula 1
0.032% of the red dye of Formula 3
0.03% of the blue dye of Formula 5
0.2% of a sulphated ethylene oxide adduct of a fatty alcohol
0.8% of a purified natural gum thickener
0.5% of mixed sodium phosphates to give a pH of 6.5.

A strip of nylon carpet containing acid dye-resist, basic dyeable nylon yarn (ICI Fibres Type K201B), regular dyeing nylon yarn (ICI Fibres Type K201) and ultra-deep dyeing nylon yarn (ICI Fibres Type 201E) is passed through a wetting-out liquor and then the top one-third is immersed in the pad liquor to give a pick-up of 300%.

The carpet is steamed vertically for ten minutes at 100°–105° C., rinsed thoroughly and dried. The hue is constant from top to bottom of the strip and good tone-in-tone effects are obtained on the differential-dyeing yarns.

EXAMPLE 3

If in Example 1 the 0.03% of the yellow dye of Formula 1 is replaced with 0.03% of the orange dye of Formula 2 then equally good tone-in-tone effects are obtained on differential-dyeing yarns.

EXAMPLE 4

Dyeing of nylon carpet yarn is carried out at 30:1 liquor ratio and pH values 5, 6 and 7. The degree of exhaustion of dye on to the fibre is determined by colorimetric examination of the exhaust liquors. If a red dye represented by Formula 3 is compared with a dye of similar shade recommended for high contrast effects on carpets, e.g. a dye of the formula

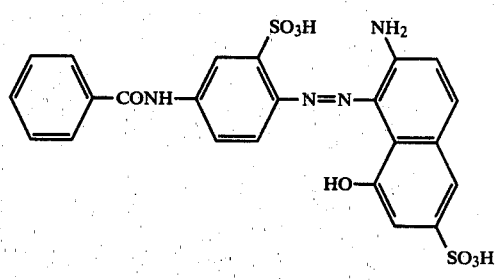

as described in U.S. Pat. No. 3,958,930, the following results are obtained:

|  | Dye of Formula 3 Exhaustion | Dye of U.S. 3,958,930 Exhaustion |
| --- | --- | --- |
| pH 5 | 98.5% | 98.5% |
| 6 | 95% | 80% |
| 7 | 59% | 34% |

We claim:

1. A process for dyeing a mixture of differential dyeing nylon fibres which comprises treating said mixture in an aqueous dyebath having a pH of 5–8 and consisting essentially of dyes selected from at least two of the following classes, the dyes being shown in the form of the free acids:

(i) a yellow dye of the formula:

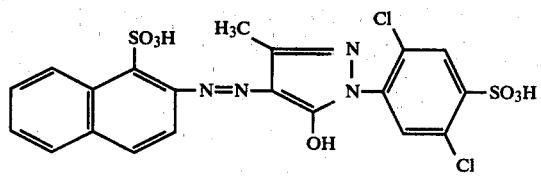

(ii) orange dyes of the formula:

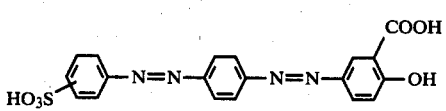

(iv) red dyes of the formula:

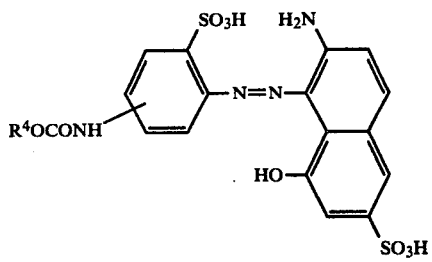

wherein the R⁴OCONH— group is in the 4— or 5-position relative to the azo group and R⁴ represents an alkyl, cycloalkyl, or aralkyl radical containing from 4 to 8 carbon atoms;

(v) blue dyes of the formula:

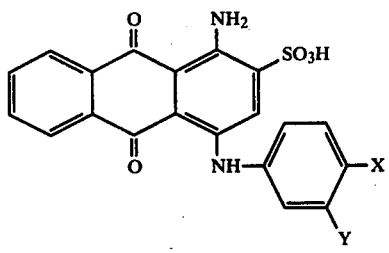

wherein one of X and Y represents —SO₃H and the other represents —NHCOOR⁵ wherein R⁵ represents an alkyl, cycloalkyl or aralkyl radical containing up to 8 carbon atoms; and (vi) blue dyes of the formula:

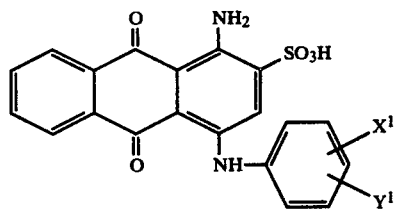

wherein one of X¹ and Y¹ represents —SO₃H and the other represents a chlorine atom.

2. A process as claimed in claim 1 wherein the dyes are selected from at least two of the following:

A yellow dye of the formula:

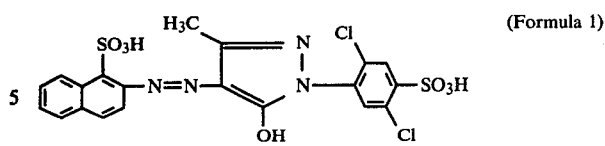

an orange dye of the formula:

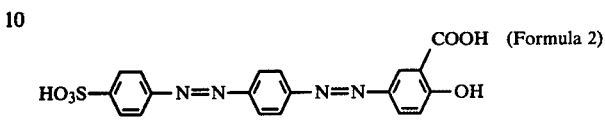

a red dye of the formula:

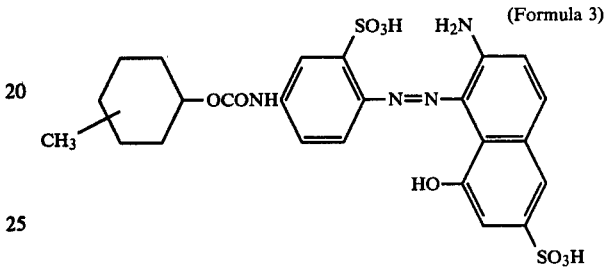

and a blue dye of the formula:

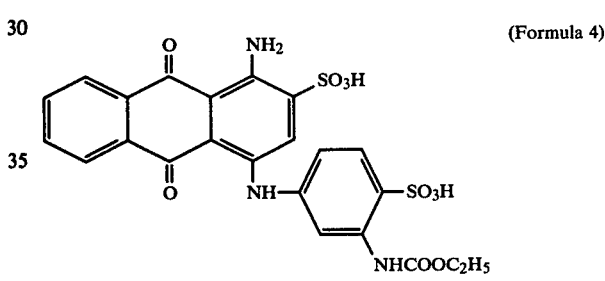

or of the formula:

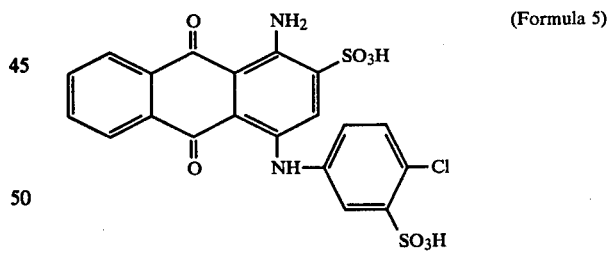

* * * * *